MECHANICAL CLUTCH FOLLOW-UP DEVICE

Original Filed Aug. 5, 1939 3 Sheets-Sheet 1

INVENTOR.
Harry F. Vickers
BY Barnes, Kisselle, Raisch & Raisch
ATTORNEYS

Aug. 4, 1953 H. F. VICKERS Re. 23,692
MECHANICAL CLUTCH FOLLOW-UP DEVICE
Original Filed Aug. 5, 1939 3 Sheets-Sheet 2
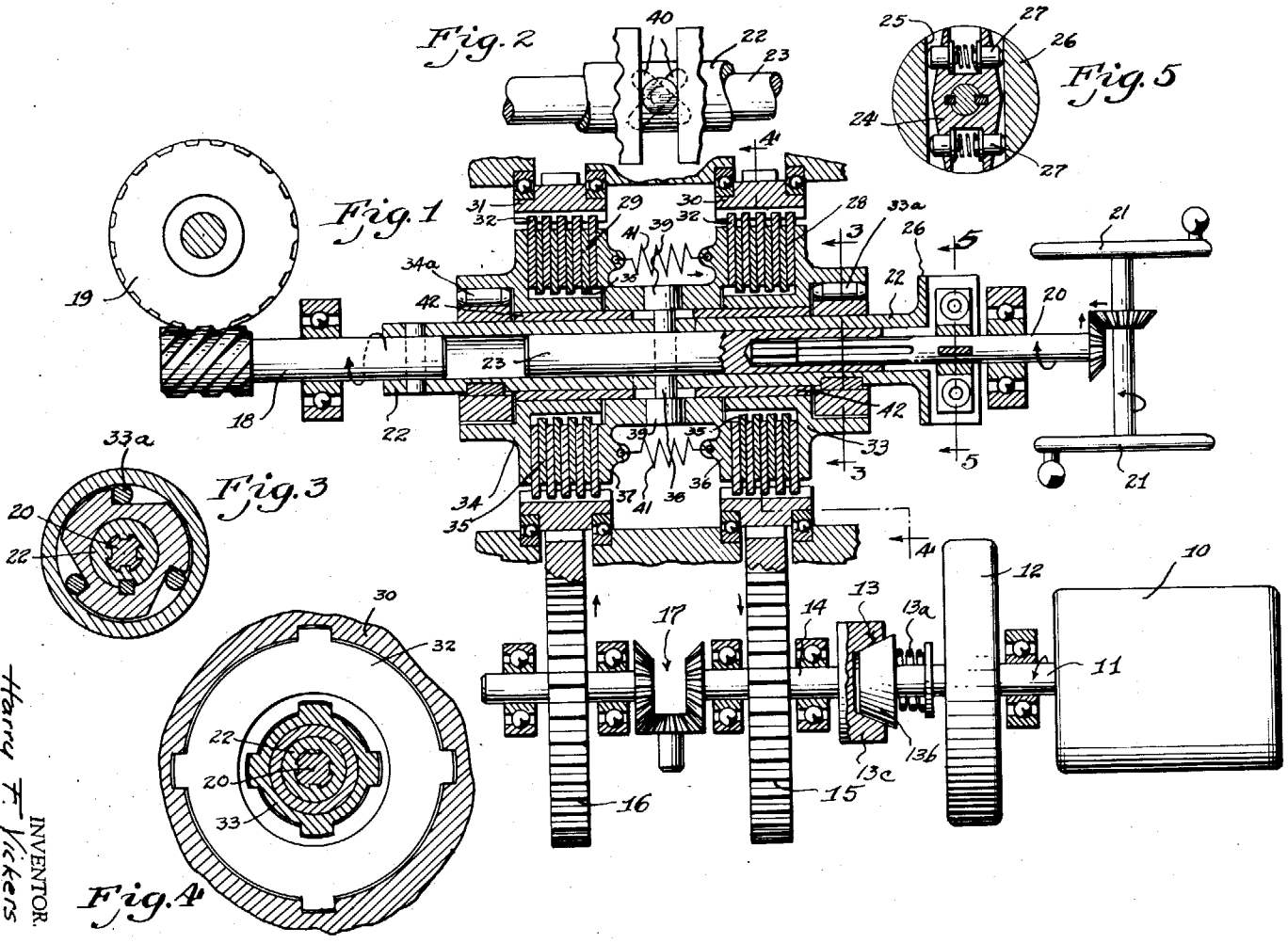
INVENTOR.
Harry F. Vickers
BY
Barnes, Kisselle, Raubline & Rauch
ATTORNEYS Aug. 4, 1953 H. F. VICKERS Re. 23,692

MECHANICAL CLUTCH FOLLOW-UP DEVICE

Original Filed Aug. 5, 1939 3 Sheets-Sheet 3

INVENTOR.
Harry F. Vickers
BY Barnes, Kisselle, Raisch & Choate
ATTORNEYS

Reissued Aug. 4, 1953 Re. 23,692

UNITED STATES PATENT OFFICE 23,692

MECHANICAL CLUTCH FOLLOW-UP DEVICE

Harry F. Vickers, Detroit, Mich., assignor to Vickers Incorporated, Detroit, Mich., a corporation of Michigan Original No. 2,311,010, dated February 16, 1943, Serial No. 288,495, August 5, 1939. Application for reissue April 28, 1953, Serial No. 351,769

9 Claims. (Cl. 74—388)

Matter enclosed in heavy brackets [ ] appears in the original patent but forms no part of this reissue specification; matter printed in italics indicates the additions made by reissue.

This invention relates to a mechanical clutch follow-up device and has particularly to do with a control in which the rotation of a powered output shaft is proportional in speed and direction to the rotation applied at a manual control.

An object of the invention is to provide a rugged follow-up device which is so constructed that there is little opportunity for failure of parts. A further object of the invention has to do with a connection between the manual input shaft and the power control unit so arranged that hydraulic or electric power may be used in the control.

Other objects and features of the invention having to do with details of construction and operation, will be brought out in the following description and claims.

In the drawings:

Fig. 1 is a sectional view of the device in which the entire control is mechanical.

Fig. 2 is a plan view of a portion of Fig. 1.

Figs. 3, 4 and 5 are sectional views taken on lines 3—3, 4—4 and 5—5, respectively, of Fig. 1.

Figure 6:
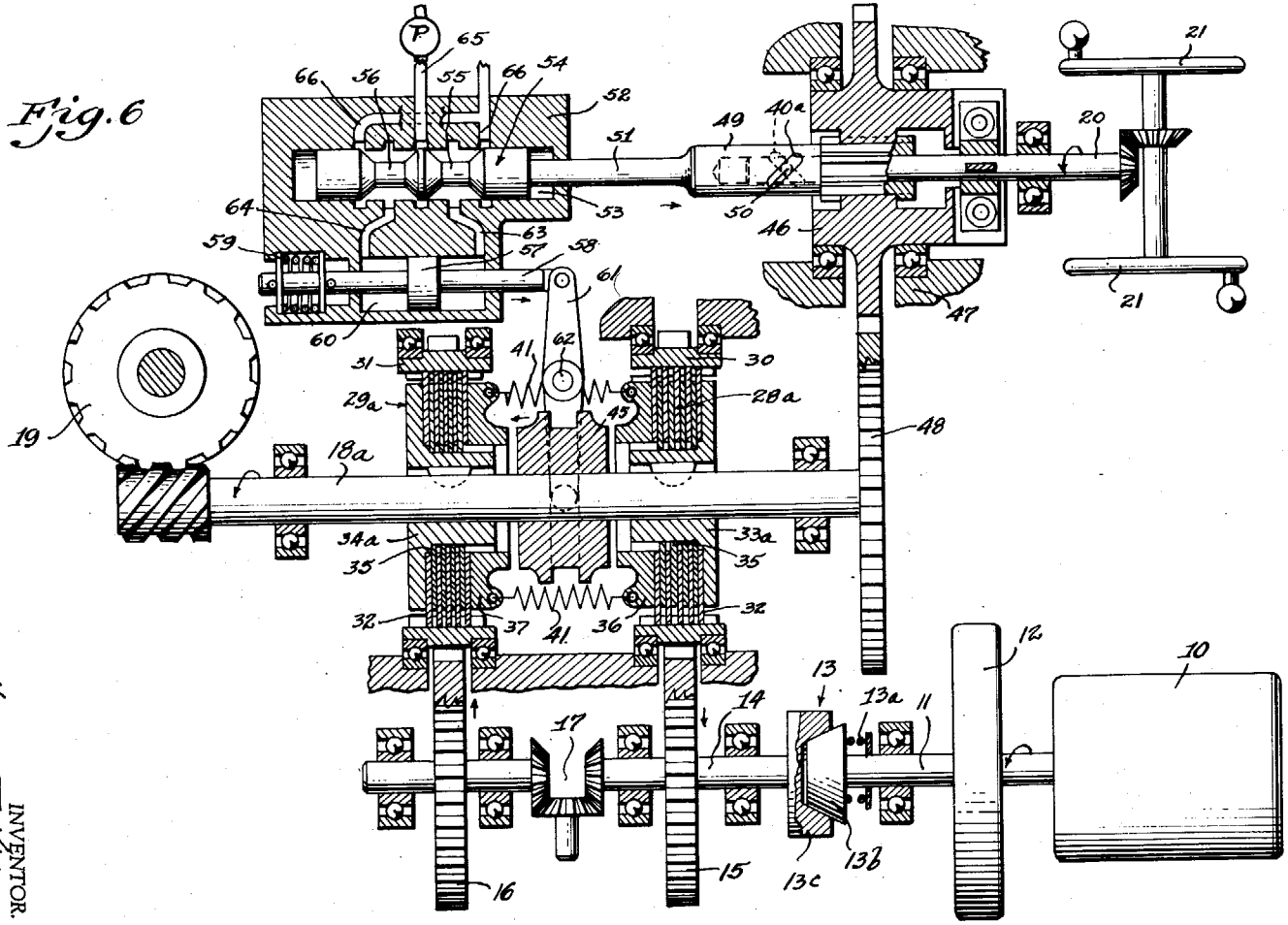

Fig. 6 is a sectional view of a modified type of control utilizing the fundamental principles of the invention in connection with a hydraulic signal device.

Figure 7:
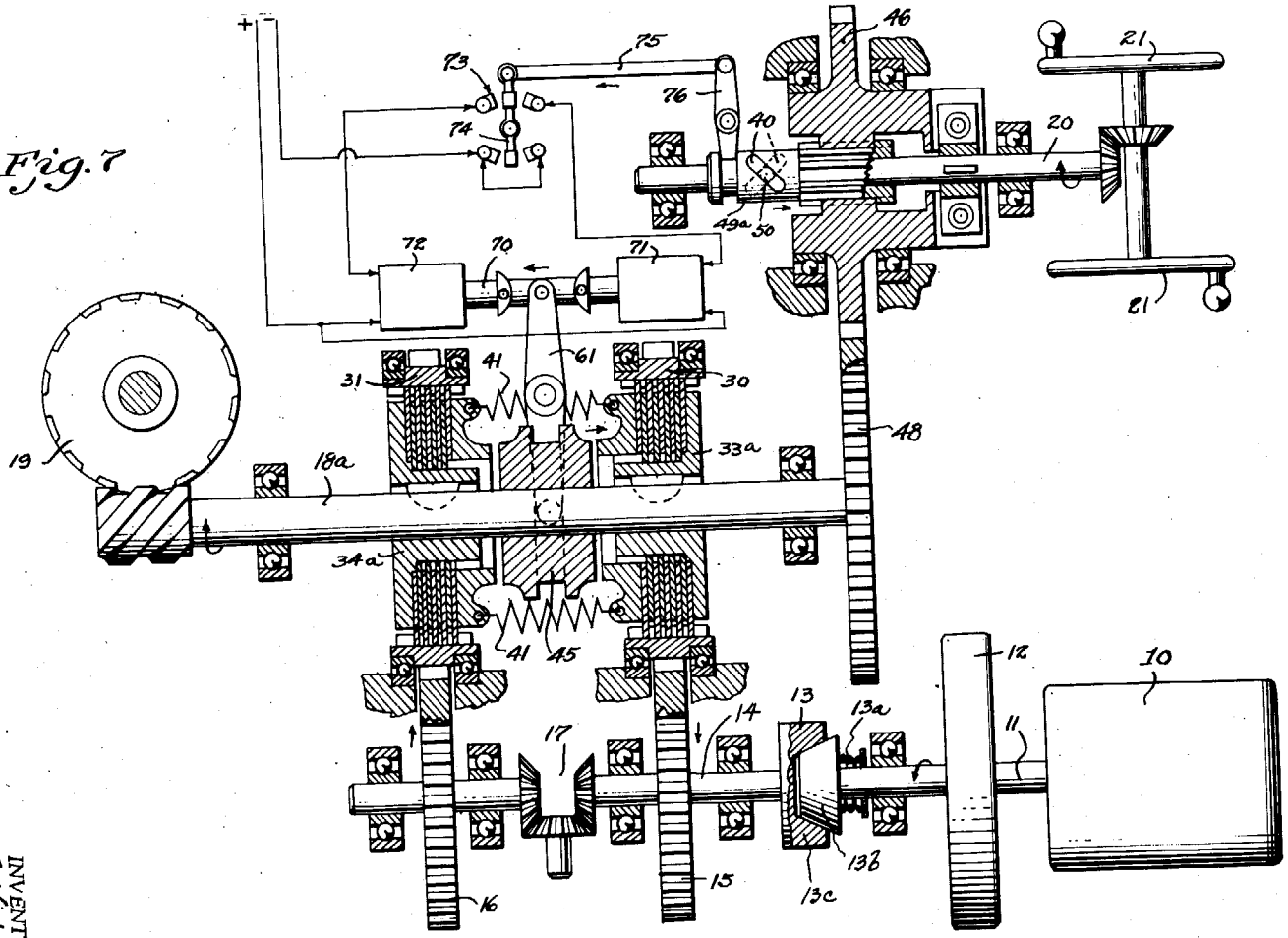

Fig. 7 is a mechanism similar to that shown in Fig. 6 utilizing an electrical signal.

Referring to Fig. 1, a motor 10 drives a shaft 11 on which is mounted a flywheel 12. An overload clutch 13 connects the shaft of the motor to a driving shaft 14 on which is mounted a power gear 15. A similar gear 16 is connected to the shaft 14 through beveled gears 17 so that gears 15 and 16 rotate at equal speeds in opposite direction. A spring 13*a* urges splined clutch member 13*b* in engagement with member 13*c* so that a definite loading may be borne by clutch 13. A power output shaft is shown at 18 arranged to control the movement of a mass 19 and a manual control shaft 20 is arranged to be operated by hand-wheels 21. The power output shaft 18 is axially connected with a tubular member 22 which slidably receives a cylindrical member 23. The shaft 20 is splined to the member 23 so that there may be a relative sliding movement between 20 and 23 but no relative rotation. Relative rotation between the shaft 20 and the tubular member 22 is limited by a yieldable connection shown in section in Fig. 5. This connection consists of a transverse tapered bar 24 keyed to shaft 20 and received in a transverse slot 25 in an enlarged portion 26 of the tubular member 22. Oppositely positioned pairs of spring pressed plungers 27, mounted in the transverse portion 24 have rounded ends bearing upon the sides of the slot 25.

The power from oppositely rotating gears 15 and 16 is to be furnished to shaft 18 through clutch devices shown at 28 and 29. These clutch devices consist of outer ring gears 30 and 31, each of which are connected to friction discs 32, and inner clutch collars 33 and 34, each of which are connected to friction discs 35. Collars 36 and 37, respectively, are used to engage the friction disc to cause engagement of the clutches. Inner clutch collars 33 and 34 are connected operatively with the tube 22 by free-wheeling mechanisms 33a and 34a, shown in section in Fig. 3.

Rigidly mounted transversely through member 23 is a pin 38 which is provided at each end with rollers 39. This pin passes through helical slots 40 (Fig. 2) which are formed in the tubular member 22. The rollers 39 are adapted to bear against the inner surfaces of clutch engaging members 36 and 37. Springs 41 urge these two clutch engaging members toward each other and to a non-engagement position. Sleeves 42 serve as bearing members for inner collars 33 and 34 and the clutch engagement rings or members 36 and 37.

Referring to the operation of the device, assuming that motor 10 is operating in the direction shown by the arrows, the gears 15 and 16 will be rotating at equal speeds in opposite directions and as long as the manual input shaft 20 is stationary, the output shaft 18 will be stationary.

Movement of the hand shaft 20 in the direction of the arrow will take up the yieldable connection between the shaft 20 and the tubular member 22 and cause a relative rotation therebetween. This relative rotation will shift the pin 38 in the helical slots 40 and cause an axial movement of the pin and the member 23 with respect to the tubular member 22. In other words, the helical slots 40 act in the manner of a screw. The movement of the pin 38 will, in this case, be toward the clutch engagement member 36 so that clutch 28 will be engaged. Ring gears 30 and 31 are, of course, operating constantly because of engagement with the ring gears 15 and 16. Upon engagement of clutch 28, the rotation of ring gear 30 will be transferred to the inner clutch member 33 and this rotation will be transmitted in turn through the free-wheeling device 33*a*, shown in Fig. 3, to the tubular member 22. This will cause a rotation of the output shaft 18 and the member 19 in the direction shown by the arrow. This rotation of shaft 18 will cause the tubular member 22 to move toward its original stationary postion with respect to the shaft 20 and consequently there will be a tendency for the pin 38 to shift back toward its central neutral position, thus releasing the clutch 28. Consequently, if a continued movement of the output shaft 18 is desired, it is necessary that there be a continued movement of the manual input shaft 20.

In the embodiment shown in Fig. 6, many of the elements are the same as described in connection with Fig. 1. The motor 10 drives the shaft 11 and a flywheel 12 and clutch 13 connects the empowering gears 15 and 16 which drive, respectively, the clutch ring gears 30 and 31. Clutches 28a and 29a are slightly modified from those previously described in that the inner clutch members 33a and 34a are keyed directly to the output shaft 18a. The clutches are engaged by the engagement collars 36 and 37 which are actuated by a sleeve member 45 slidably mounted on the shaft 18a.

The input shaft 20 in this embodiment is connected through the yieldable connection, previously described and shown in section in Fig. 5, to a gear collar 46 which is mounted in a suitable bearing 47 and which engages a gear 48 on the end of shaft 18a. One end of the input shaft 20 is telescoped within a member 49 which is provided with helical slots 40a previously described in connection with sleeve 22. A pin 50 is mounted in the shaft 20 and extends into the helical slots so that relative rotation between the member 20 and the member 49 will cause a relative axial shifting between the two members.

The member 49 is formed with an extension 51 which leads to a valve housing 52. At the end of the extension 51 is a recess 53 in which is slidably mounted a valve 54. This valve 54 is composed of a cylindrical member having spaced restricted portions 55 and 56. Also mounted in the housing 52 is a piston 57 having a rod 58 extending therethrough. One end of the rod is controlled by a spring 59 which centers the piston 57 in a cylinder 60 by reason of the action of suitable collars and pins on the rod 58. The other end of the rod is connected to a lever 61 which is pivoted at 62 and connected at its other end with clutch engaging sleeve 45. Passageways 63 and 64 lead from the valve opening 53 to the respective ends of cylinder 60. A pressure passageway 65 leads from a pump to the valve recess and passageways 66 lead to the tank.

With the motor 10 in operation, when the hand-wheel 21 is stationary, the valve 54 and the piston 57 will be centered so that pressure from conduit 65 may pass the restrictions in the valve to the tank ports 66. Movement of the hand shaft 20, permitted by the yieldable connection between the shaft and the gear collar 46, will cause a shifting of valve 54 because of the screw action of the pin 50 in the helical slots 40a. A shifting of the valve 54 to the right, for example, will open the pressure port 65 to the cylinder port 64 and the cylinder port 63 will be connected to tank port 66. Pressure will thus be exerted on the left hand side of the piston 57 so that clutch engagement collar 45 will be shifted to the left, by the action of the lever 61, to engage the clutch 29a. The engagement of this clutch will transmit rotary motion from the rotating ring gear 31 to the inner clutch member 34a and to the output shaft 18a. However, since the output shaft 18a is connected to the gear 48a, there will be a movement of the gear collar 46. This gear collar 46 is slidably splined to the member 49 so that this member will rotate, thus tending to move the pin 50 in the helical slots back to its original neutral position. Consequently, in order to maintain a constant movement of the output shaft 18a, it is essential that the manual input shaft 20 be continuously rotated.

The embodiment shown in Fig. 7 is similar to that described in connection with Fig. 6 except that an electrical circuit is used to supplant the hydraulic circuit of Fig. 6. In Fig. 7 a shaft 70 is connected to the lever 61 and this shaft has its ends mounted, respectively, in solenoids 71 and 72. An operating switch for the solenoids is shown generally at 73. This switch has a control element 74 which is adapted to be shifted by linkage 75 and a lever 76, the latter being controlled by the movement of a member 49a. The movement of the member 49a is controlled as was the member 49 by movement of the input shaft 20 and the pin 50. From the electrical circuit shown in the drawings, it will be clear that when the input shaft 20 is rotated, the switch 73 will be closed in one direction or the other and solenoid 71 or 72 will be energized. This will cause a shifting of the member 70 and engagement of one of the clutches by the movement of sleeve 45. The response movement is transmitted as previously described, through gear 48 and the gear collar 46.

In each of the above embodiments of the invention, the speed of the operating shaft may be definitely controlled by the speed of the input shaft since any tendency for the output shaft to gain upon the input shaft will be immediately counteracted by the response movement of sleeve 22 in Fig. 1 and gears 48 in Figs. 6 and 7.

In each of the above mechanisms it is also possible to effect direct manual control of the power shafts in case of power failure at 10. For example, in Fig. 1, the free wheeling clutches 33a and 34a permit driving of tube 22 by shaft 20 if the engagement of the clutches 28 or 29 is ineffective because of power failure. In Fig. 6, in case of power failure at 10, the hydraulic control pressure may be shut off to permit direct manual control and similarly, in Fig. 7, the electric power may be cut out.

Each of the above mechanisms is arranged to check kick-back or kick-ahead forces which may act on the driven member 19. These kicking forces are transmitted to the clutch 13 and flywheel 12. The clutch limits the force which may be transmitted to the motor and the flywheel acts similarly to protect the motor against these forces.

I claim:

[1. In a follow-up device, an operating member, a constantly operated power means, oppositely rotating means driven by said power means, clutch means arranged to connect one or the other of said oppositely rotating means to said operating member, and means to cause engagement of one or the other of said clutch means comprising a control shaft, a second shaft operably connected to said operating member, means connecting said control shaft and said second shaft whereby a relative rotation will result in an axial movement between said shafts, clutch engaging means, and means operably connecting said second shaft with said clutch engaging means whereby relative slidable movement between said shafts will result in engagement of one of said clutches.]

[2. In a follow-up device, an operating member, a constantly operated power means, oppositely rotating means driven by said power means, clutch means arranged to connect one or the other of said oppositely rotating means to said operating member, and means to cause engagement of one or the other of said clutch means comprising a control shaft, a second shaft operably connected to said operating member, means connecting said control shaft and said second shaft whereby a relative rotation will result in an axial movement between said shafts, clutch engaging means, and means operably connecting said second shaft with said clutch engaging means whereby relative slidable movement between said shafts will result in engagement of one of said clutches, depending on the direction of movement of said control shaft, and means connecting said operating member with shafts whereby movement of said operating member will tend to nullify the effect of the movement of said control shaft.]

3. In a follow-up device, an operating shaft, a constantly operated power means, oppositely rotating means driven by said power means, clutch means arranged to connect one or the other of said oppositely rotating means to said operating shaft, and means to cause engagement of one or the other of said clutch means comprising a hand operated shaft, a second shaft connected to said operating shaft and telescoping with said hand operated shaft, means connecting said hand operated shaft and said telescoping shaft whereby a relative rotation will result in an axial movement between said shafts, clutch engaging means and means operably connecting said hand operated and said telescoping shafts with said clutch engaging means whereby axial movement between said shafts will result in engagement of one of said clutches.

4. In a follow-up device, an operating shaft, a constantly operated power means, oppositely rotating means driven by said power means, clutch means arranged to connect one or the other of said oppositely rotating means to said operating shaft, each of said clutch means comprising an outer ring gear driven by one of said rotating means, an inner clutch collar operatively connected to said operating shaft by free-wheeling connecting means, and friction discs between said ring gears and said inner clutch collar, and means to cause engagement of one or the other of said clutch means comprising a hand operated shaft, a second shaft connected to said operating shaft and telescoping with said hand operated shaft, means connecting said hand operated shaft and said telescoping shaft whereby a relative rotation will result in an axial movement between said shafts, clutch engaging means and means operably connecting said hand operated and said telescoping shafts with said clutch engaging means whereby axial movement between said shafts will result in engagement of one of said clutches, said free-wheeling connecting means being so arranged that said operating shaft may be moved directly by movement of said hand operated shaft in the event of a failure of said power means.

5. In a follow-up device, an operating shaft, a constantly operated power means, oppositely rotating means driven by said power means, clutch means arranged to connect one or the other of said oppositely rotating means to said operating shaft, means to cause engagement of one or the other of said clutch means, a fluid operated piston connected to said clutch engaging means, a cylinder surrounding said piston, a source of fluid pressure, valve means for directing fluid pressure to one end or the other of said piston means to engage one or the other of said clutches, manually operable means, comprising a rotatable shaft, and means connecting said shaft with said valve whereby rotation of said shaft will cause a shifting of said valve, to connect pressure to one end or the other of said piston, and means connected to said operating shaft for counteracting the effect of movement of said manually operated shaft.

6. In a follow-up device, an operating shaft, a constantly operated power means, oppositely rotating means driven by said power means, clutch means arranged to connect one or the other of said oppositely rotating means to said operating shaft, means to cause engagement of one or the other of said clutch means, electrically operated means to cause movement of said clutch engaging means from a neutral position to one of its operative positions, switch means to cause actuation of said electrically operated means, a rotatable hand input shaft and means connecting said input shaft to said switch means whereby rotation of said input shaft will cause engagement of one or the other of said clutches, and means operated by said operating shaft to nullify the effect of said input shaft whereby a continued movement of said hand input shaft is required to effect continued movement of said operating shaft.

*7. In a follow-up device, an operating member, a constantly operated power means, oppositely rotating means driven by said power means, clutch means arranged to connect one or the other of said oppositely rotating means to said operating member, and means to cause engagement of one or the other of said clutch means comprising a control shaft mounted to move substantially through the same rotational travel as the operating member, a second shaft operably connected to said operating member, means connecting said control shaft and said second shaft whereby a relative rotation will result in an axial movement between said shafts, clutch engaging means, and means operably connecting said second shaft with said clutch engaging means whereby relative slidable movement between said shafts will result in engagement of one of said clutches.*

*8. In a follow-up device, an operating member, a constantly operated power means, oppositely rotating means driven by said power means, clutch means arranged to connect one or the other of said oppositely rotating means to said operating member, and means to cause engagement of one or the other of said clutch means comprising a control shaft, a second shaft operably connected to said operating member, means connecting said control shaft and said second shaft whereby a relative rotation will result in an axial movement between said shafts, clutch engaging means, and means operably connecting said second shaft with said clutch engaging means whereby relative slidable movement between said shafts will result in engagement of one of said clutches, and free wheeling mechanism intermediate the operating member and the power means effective to enable manual operation of the operating member when the power means is stationary.*

*9. In a follow-up device, an operating member, a constantly operated power means, oppositely rotating means driven by said power means, clutch means arranged to connect one or the other of*

*said oppositely rotating means to said operating member, and means to cause engagement of one or the other of said clutch means comprising a control shaft, a second shaft operably connected to said operating member, means connecting said control shaft and said second shaft, the connections of said second shaft to the operating member and to the control shaft both being arranged for limited relative sliding motion, one along a helical path and the other along an axial path whereby a relative rotation will result in an axial movement between said shafts, clutch engaging means, and means operably connecting said second shaft with said clutch engaging means whereby relative slidable movement between said shafts will result in engagement of one of said clutches.*

*10. In a follow-up device, an operating shaft, a constantly operated power means, oppositely rotating means driven by said power means, clutch means arranged to connect one or the other of said oppositely rotating means to said operating shaft, and means to cause engagement of one or the other of said clutch means comprising a hand operated shaft mounted for unlimited rotation coaxially with the operating shaft, a second shaft connected to said operating shaft and telescoping with said hand operated shaft, means connecting said hand operated shaft and said telescoping shaft the connections of the telescoping shaft with the operating shaft and with the control shaft being relatively slidable, one axially and the other helically whereby a relative rotation between the control and operating shafts will result in an axial movement of the telescoping shaft, said telescoping shaft having means for engaging one or the other of said clutch means in response to axial motion in either direction.*

*11. In a follow-up device, an operating shaft, a constantly operated power means, oppositely*

*rotating means driven by said power means, clutch means arranged to connect one or the other of said oppositely rotating means to said operating shaft, and means to cause engagement of one or the other of said clutch means comprising a hand operated shaft, a second shaft connected to said operating shaft and telescoping with said hand operated shaft, means connecting said hand operated shaft and said telescoping shaft whereby a relative rotation will result in an axial movement between said shafts, clutch engaging means and means operably connecting said hand operated and said telescoping shafts with said clutch engaging means whereby axial movement between said shafts will result in engagement of one of said clutches, one of said shafts being radially slotted and at least one radially extending finger on another of said shafts and extending through said one shaft for operating engagement with the remaining one of said shafts.*

VICKERS INCORPORATED,
By KENNETH R. HERMAN,
*Exec. Vice President and General Manager.*

References Cited in the file of this patent or the original patent

UNITED STATES PATENTS

| Number | Name | Date |
|---|---|---|
| 803,565 | Dina | Nov. 7, 1905 |
| 1,148,176 | Liberty | July 27, 1915 |
| 1,355,152 | Laird | Oct. 12, 1920 |
| 1,656,062 | Harke | Jan. 10, 1928 |
| 1,838,304 | Garrard | Dec. 29, 1931 |
| 2,150,019 | Baule | Mar. 7, 1939 |
| 2,177,199 | Lansing | Oct. 24, 1939 |

FOREIGN PATENTS

| Number | Country | Date |
|---|---|---|
| 377,938 | France | Sept. 19, 1907 |